(12) United States Patent
Sato

(10) Patent No.: US 11,152,850 B2
(45) Date of Patent: Oct. 19, 2021

(54) POWER SOURCE APPARATUS AND COMMUNICATION APPARATUS

(71) Applicant: FUJITSU LIMITED, Kawasaki (JP)

(72) Inventor: Hiroyuki Sato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 53 days.

(21) Appl. No.: 16/671,839

(22) Filed: Nov. 1, 2019

(65) Prior Publication Data

US 2020/0161961 A1 May 21, 2020

(30) Foreign Application Priority Data

Nov. 15, 2018 (JP) .............................. JP2018-214879

(51) Int. Cl.
| | | |
|---|---|---|
| *H02M 1/32* | (2007.01) | |
| *H02J 7/00* | (2006.01) | |
| *H02M 1/08* | (2006.01) | |
| *H02M 3/155* | (2006.01) | |

(52) U.S. Cl.
CPC ............. *H02M 1/32* (2013.01); *H02J 7/0063* (2013.01); *H02M 1/08* (2013.01); *H02M 3/155* (2013.01); *H02J 2007/0067* (2013.01)

(58) Field of Classification Search
None
See application file for complete search history.

(56) References Cited

U.S. PATENT DOCUMENTS

| | | | | |
|---|---|---|---|---|
| 8,633,618 B2* | 1/2014 | Iijima | .................. | H03K 17/063 |
| | | | | 307/109 |
| 10,447,053 B2* | 10/2019 | Tanaka | ............... | G06K 7/10158 |
| 10,686,437 B2* | 6/2020 | Chauhan | ................. | H02M 1/36 |
| 2007/0019452 A1* | 1/2007 | Ohkubo | ............ | H04W 52/0277 |
| | | | | 363/101 |
| 2007/0047269 A1* | 3/2007 | Hachiya | ............ | H02M 3/33523 |
| | | | | 363/21.17 |
| 2009/0059632 A1* | 3/2009 | Li | ...................... | H02M 3/33523 |
| | | | | 363/124 |
| 2010/0225295 A1* | 9/2010 | Kranz | ....................... | G05F 1/59 |
| | | | | 323/311 |
| 2013/0313903 A1* | 11/2013 | Kayama | .................. | G06F 1/263 |
| | | | | 307/26 |
| 2015/0115917 A1* | 4/2015 | Yu | ....................... | H02M 3/1584 |
| | | | | 323/272 |
| 2016/0181930 A1* | 6/2016 | Chen | ........................ | H02M 1/36 |
| | | | | 363/21.18 |
| 2017/0265287 A1* | 9/2017 | Avrahamy | ............. | A01G 7/045 |
| 2017/0338738 A1* | 11/2017 | Sun | ........................ | H02M 3/156 |
| 2018/0183256 A1* | 6/2018 | Tanaka | ..................... | H02M 1/00 |

(Continued)

FOREIGN PATENT DOCUMENTS

| | | |
|---|---|---|
| JP | 63-7388 U | 1/1988 |
| JP | 4-291610 A | 10/1992 |

(Continued)

*Primary Examiner* — Lincoln D Donovan
*Assistant Examiner* — Khareem E Almo
(74) *Attorney, Agent, or Firm* — Fujitsu Patent Center

(57) ABSTRACT

A power source apparatus includes a switching control circuit configured to output a switching signal to switch a power source supplying power to each of a plurality of loads, and a reset control circuit having a plurality of output terminals outputting reset signals that reset the plurality of loads in response to the switching signal.

16 Claims, 12 Drawing Sheets

(56) References Cited

U.S. PATENT DOCUMENTS

| | | | | |
|---|---|---|---|---|
| 2019/0229620 A1* | 7/2019 | Chen | ................ | H02M 3/07 |
| 2020/0021285 A1* | 1/2020 | Chauhan | ................ | H02M 1/36 |
| 2020/0161961 A1* | 5/2020 | Sato | ................ | H02M 3/155 |
| 2021/0044214 A1* | 2/2021 | Ohashi | ................ | H02M 1/4225 |

FOREIGN PATENT DOCUMENTS

| | | |
|---|---|---|
| JP | 5-196662 A | 8/1993 |
| JP | 5-211728 A | 8/1993 |
| JP | 7-250437 A | 9/1995 |
| JP | 9-93831 A | 4/1997 |
| JP | 2000-267769 A | 9/2000 |

* cited by examiner

POWER SOURCE APPARATUS AND COMMUNICATION APPARATUS

CROSS-REFERENCE TO RELATED APPLICATION

This application is based upon and claims the benefit of priority of the prior Japanese Patent Application No. 2018-214879, filed on Nov. 15, 2018, the entire contents of which are incorporated herein by reference.

FIELD

The embodiments discussed herein relate to a power source apparatus and a communication apparatus.

BACKGROUND

As a technology relating to a power source apparatus including a power generation element such as a solar battery and an electricity storage element such as a secondary battery, the following technology has been known, for example.

For example, a watch with a solar battery has been known that includes a first switch serially coupled with a secondary battery and a first comparator coupling the secondary battery and the solar battery by turning on the first switch when voltage of the secondary battery is equal to or lower than a first voltage value. The watch with the solar battery further includes a second switch serially coupled with a watch circuit, a second comparator coupling the secondary battery and the watch circuit by turning on the second switch when voltage of the secondary battery is equal to or higher than the first voltage value, and a third switch coupled with the first switch in parallel. The watch with the solar battery further includes a Schmidt comparator coupling the solar battery and the secondary battery by turning on the third switch when voltage of the secondary battery is equal to or higher than the first voltage value and is equal to or lower than a second voltage value that is higher than the first voltage value.

A power source apparatus including a solar battery and a charging battery that stores energy generated in the solar battery has been known that includes a charging voltage control unit that, when charging voltage of the charging battery reaches a first level, discharges to a second level that is lower than the first level.

For example, as related art, Japanese Unexamined Utility Model Registration Application Publication No. 63-7388 and Japanese Laid-open Patent Publication No. 7-250437 have been disclosed.

A power source apparatus has been known that includes a plurality of power sources and a unit that switches a power source supplying power to loads among the plurality of power sources. With this power source apparatus, even when power supply from one power source is disabled, power supply from the other power source to the load is enabled so that power is supplied to the load in a stable manner.

However, in such a power source apparatus, upon the power source switching, a voltage gap may occur in which the power source voltage to be supplied to the load rapidly changes. It is assumed here that the loads are a first functional unit and a second functional unit that mutually communicate by establishing a communication link (handshake) between them. In other words, for example, the first functional unit and the second functional unit receive supply of power from the power source apparatus so that a communication link (handshake) is established between them. Thus, the first functional unit and the second functional unit communicate with each other to implement predetermined functions. It is assumed that each of the first functional unit and the second functional unit has so-called a power-on reset function and has a reset state when powered on. The power-on reset function may operate even when a voltage gap occurs. It is assumed here that the magnitudes of the voltage gaps with which the power-on reset function operates are different between the first functional unit and the second functional unit.

In such a case, when a voltage gap occurs due to the power source switching, one of the first functional unit and the second functional unit may be reset because of its power-on reset function. In this case, the communication link (handshake) established between the first functional unit and the second functional unit is interrupted, and the first functional unit and the second functional unit may not perform processing after this and substantially become functionally disabled. Note that when the power-on reset function operates in both of the first functional unit and the second functional unit, a communication link (handshake) is established again between the first functional unit and the second functional unit after the reset, and it is considered that the problem may not occur.

As one of methods for solving the problem, a method may be considered that provides a bypass capacitor between a power source line and a ground line to reduce a change of voltage caused by power source switching. However, in this case, the bypass capacitor is required to have a large capacitance to guarantee its operation under the worst condition. In this case, because the time for charging the bypass capacitor is long upon start-up, the starts of the first functional unit and the second functional unit are disadvantageously delayed.

In view of this, occurrence of operational malfunctions of loads due the power source switching is desirably suppressed.

SUMMARY

According to an aspect of the embodiments, a power source apparatus includes a switching control circuit configured to output a switching signal to switch a power source supplying power to each of a plurality of loads, and a reset control circuit having a plurality of output terminals outputting reset signals that reset the plurality of loads in response to the switching signal.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
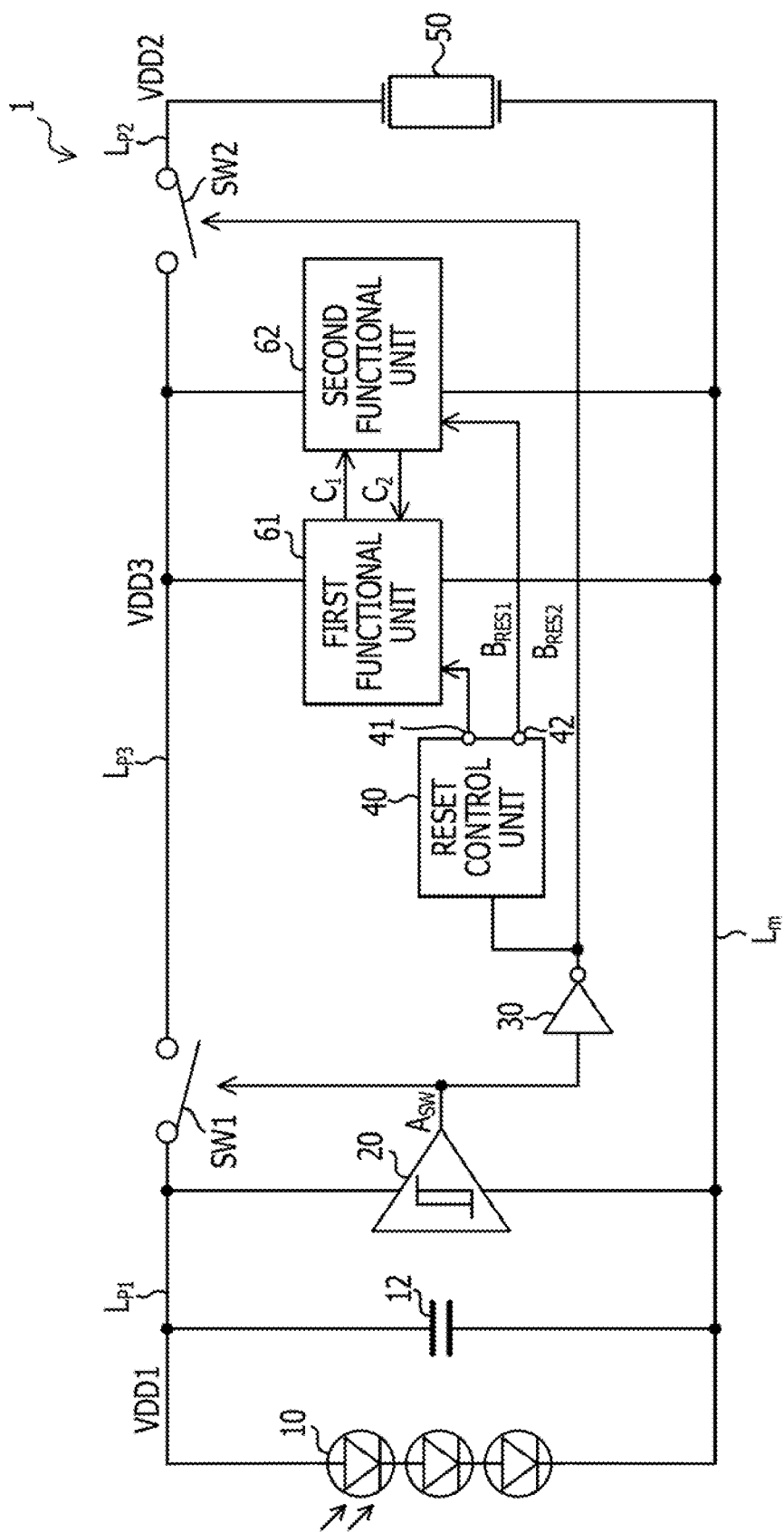
FIG. 1 is a diagram illustrating an example of a configuration of a power source apparatus according to an embodiment of a disclosed technology.

Examples of embodiments of a technology disclosed herein will be described with reference to drawings. Identical references are given to identical or equivalent components or parts in the drawings.

First Embodiment

FIG. 1 is a diagram illustrating an example of a configuration of a power source apparatus 1 according to an embodiment of the technology disclosed herein. The power source apparatus 1 includes a power generating unit 10 as a first power source, a capacitor 12, an electricity storage unit 50 as a second power source, a first switch SW1, a second switch SW2, a switching control unit 20, and a reset control unit 40. FIG. 1 illustrates a first functional unit 61 and a second functional unit 62 as loads receiving supply of power from the power source apparatus 1 along with the power source apparatus 1.

The power generating unit 10 as a first power source converts environmental energy such as light, heat, vibrations, and electric waves to electric power and outputs it as generation voltage. In a case where a power generation element that generates alternating current voltage from vibrations and electric waves, for example, is used as the power generating unit 10, a converter may further be required that converts from alternating current voltage to direct current voltage. A positive electrode of the power generating unit 10 is coupled to a power source line $L_{P1}$, and a negative electrode of the power generating unit 10 is coupled to a ground line $L_m$.

The first switch SW1 has one end coupled to the power source line $L_{P1}$ and the other end coupled to a power source line $L_{P3}$. The first switch SW1 has an ON state or an OFF state in accordance with a switching signal $A_{SW}$ supplied from the switching control unit 20.

The capacitor 12 is coupled with the power generating unit 10 in parallel. In other words, for example, one electrode of the capacitor 12 is coupled with the power source line $L_{P1}$ on the positive side, and the other electrode of the capacitor 12 is coupled with the ground line $L_m$. The capacitor 12 stores electric power generated by the power generating unit 10. The capacitor 12 has a smaller storage capacitance than that of the electricity storage unit 50.

The electricity storage unit 50 as a second power source is an electricity storage element having a larger storage capacitance than the capacitor 12, such as a secondary battery and a super capacitor. A positive electrode of the electricity storage unit 50 is coupled to a power source line $L_{P2}$, and a negative electrode of the electricity storage unit 50 is coupled to the ground line $L_m$. Voltage VDD2 depending on the charging voltage of the electricity storage unit 50 is supplied to the power source line $L_{P2}$.

The second switch SW2 has one end coupled to the power source line $L_{P2}$ and the other end coupled to the power source line $L_{P3}$. The second switch SW2 has an ON state or an OFF state in accordance with a switching signal $A_{SW}$ supplied from the switching control unit 20.

The switching control unit 20 controls the first switch SW1 and the second switch SW2 based on the level of voltage VDD1 generated in the power source line $L_{P1}$ to switch the power source to supply power to the first functional unit 61 and the second functional unit 62. The switching control unit 20 outputs the switching signal $A_{SW}$ based on the level of the voltage output from the power generating unit 10.

In other words, for example, in a case where the level of the voltage VDD1 of the power source line $L_{P1}$ is higher than a threshold value VH, the switching control unit 20 outputs the switching signal $A_{SW}$ that turns on the first switch SW1. The switching signal $A_{SW}$ that turns on the first switch SW1 is level-inverted by an inverter 30 and then is supplied to the second switch SW2. Thus, the second switch SW2 has an OFF state.

On the other hand, in a case where the level of the voltage VDD1 of the power source line $L_{P1}$ is lower than a threshold value VL that is lower than the threshold value VH, the switching control unit 20 outputs the switching signal $A_{SW}$ that turns off the first switch SW1. The switching signal $A_{SW}$ that turns off the first switch SW1 is level-inverted by the inverter 30 and then is supplied to the second switch SW2. Thus, the second switch SW2 has an ON state. In other words, for example, the first switch SW1 and the second switch SW2 are turned on and off complementarily.

The first functional unit 61 and the second functional unit 62 establish a communication link between them and communicate with each other to implement predetermined functions. The first functional unit 61 and the second functional unit 62 operate with voltage VDD3 supplied to the power source line $L_{P3}$ as power source voltage. When the first switch SW1 has an ON state, the voltage VDD3 is equal to the voltage VDD1 of the power source line $L_{P1}$. When the second switch SW2 has an ON state, the voltage VDD3 is equal to the voltage VDD2 of the power source line $L_{P2}$.

The first functional unit 61 transmits a pulse signal $C_1$ to the second functional unit 62, and the second functional unit 62 transmits a pulse signal $C_2$ to the first functional unit 61. The first functional unit 61 starts at the fall of the pulse signal $C_2$ supplied from the second functional unit 62, supplies the pulse signal $C_1$ to the second functional unit 62, and then has a stop state (sleep state). The second functional unit 62 starts at the fall of the pulse signal $C_1$ supplied from the first functional unit 61, supplies the pulse signal $C_2$ to the first functional unit 61, and then has a stop state (sleep state). The pulse signal $C_2$ is a signal that falls after a predetermined period from a fall of the pulse signal $C_1$.

Each of the first functional unit 61 and the second functional unit 62 has a power-on reset function and has a reset state upon powered on and is started. The power-on reset functions may also operate when a voltage gap occurs, and the magnitudes of the voltage gaps with which the power-on reset functions operate are different between the first functional unit 61 and the second functional unit 62. In other words, for example, when the voltage VDD3 supplied to the power source line $L_{P3}$ rapidly changes, the power-on reset function may operate in one of the first functional unit 61 and the second functional unit 62. Each of the first functional unit 61 and the second functional unit 62 has a reset input terminal, and the first functional unit 61 and the second functional unit 62 are reset in accordance with reset signals $B_{RES1}$ and $B_{RES2}$ supplied from the reset control unit 40.

The reset control unit 40 simultaneously outputs, from output terminals 41 and 42, the reset signals $B_{RES1}$ and $B_{RES2}$, respectively, that reset the first functional unit 61 and the second functional unit 62, respectively, in accordance with the switching signal $A_{SW}$ output from the switching control unit 20. More specifically, for example, the reset control unit 40 outputs pulses as the reset signals $B_{RES1}$ and $B_{RES2}$ at a time when the switching signal $A_{SW}$ that turns off the first switch SW1 (and turns on the second switch SW2) is output and at a time when the switching signal $A_{SW}$ that turns on the first switch SW1 (and turns off the second switch SW2) is output. In other words, for example, the reset control unit 40 outputs the reset signals $B_{RES1}$ and $B_{RES2}$ at a time when the power source that supplies power to the first functional unit 61 and the second functional unit 62 is switched (or at a time when the switching signal $A_{SW}$ is level-inverted). The first functional unit 61 and the second functional unit 62 have a reset state at the same time as each other in response to the reset signals $B_{RES1}$ and $B_{RES2}$ output from the reset control unit 40.

The reset control unit 40 may preferably be a monostable multi-vibrator that outputs pulses having a predetermined pulse width in response to switching of the level of an input signal, for example. According to this embodiment, the reset control unit 40 receives the switching signal $A_{SW}$ through the inverter 30. However, the reset control unit 40 may directly receive the switching signal $A_{SW}$.

The reset control unit 40 may output pulses as the reset signals $B_{RES1}$ and $B_{RES2}$ after a lapse of a predetermined period from a time when the power source that supplies power to the first functional unit 61 and the second functional unit 62 is switched (at a time when the switching signal $A_{SW}$ is level-inverted). In other words, for example, the output timing of the reset signals $B_{RES1}$ and $B_{RES2}$ may be delayed from the level inversion of the switching signal $A_{SW}$.

Figure 2:
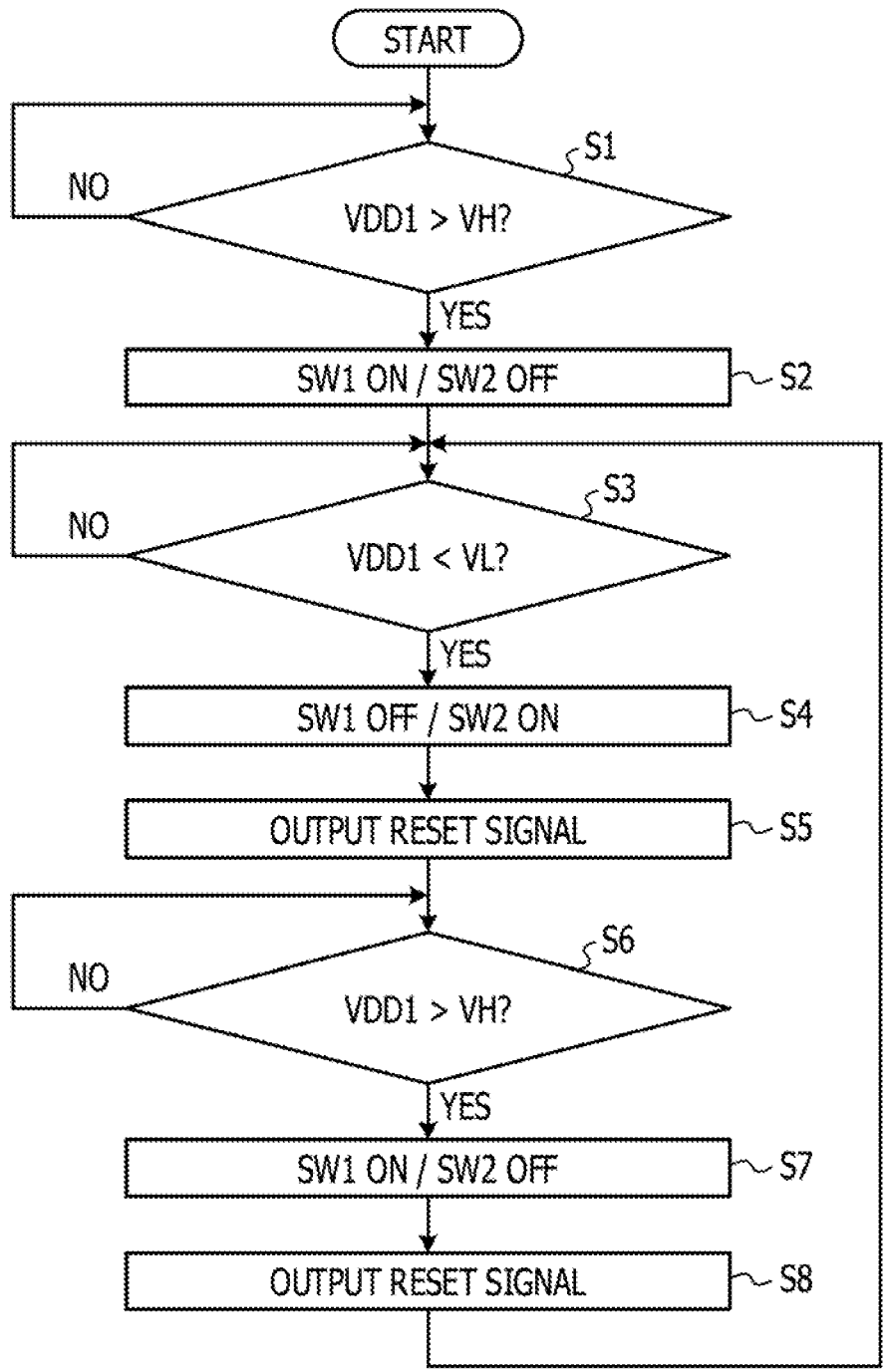
FIG. 2 is a flowchart illustrating an example of operations of the power source apparatus according to the embodiment of the disclosed technology.

FIG. 2 is a flowchart illustrating an example of operations to be performed by the power source apparatus 1. It is assumed here that the electricity storage unit 50 is fully charged. It is further assumed that, at an initial state, the first switch SW1 and the second switch SW2 have an OFF state.

In step S1, the switching control unit 20 determines whether the voltage output from the power generating unit 10, that is, the voltage VDD1 of the power source line $L_{P1}$ is higher than the threshold value VH or not.

If the switching control unit 20 detects that the voltage VDD1 of the power source line $L_{P1}$ is higher than the threshold value VH, the switching control unit 20 in step S2 outputs the switching signal $A_{SW}$ having a high level, for example. Thus, the first switch SW1 has an ON state. The high-level switching signal $A_{SW}$ passes through the inverter 30 so that it is inverted to have a low level, and the low-level switching signal $A_{SW}$ is supplied to the second switch SW2. Thus, the second switch SW2 has an OFF state. When the first switch SW1 has an ON state and the second switch SW2 has an OFF state, the power source line $L_{P3}$ is coupled to the power source line $L_{P1}$ through the first switch SW1 so that the power generating unit 10 and the first functional unit 61 and the second functional unit 62 are coupled. Thus, the first functional unit 61 and the second functional unit 62 operate with the power supplied from the power generating unit 10.

In step S3, the switching control unit 20 determines whether the voltage VDD1 of the power source line $L_{P1}$ is lower than the threshold value VL (<VH) or not. If the voltage VDD1 is higher than the threshold value VL, the power supply from the power generating unit 10 to the first functional unit 61 and the second functional unit 62 continues.

If the switching control unit 20 detects that the voltage VDD1 of the power source line $L_{P1}$ is lower than the threshold value VL, the switching control unit 20 in step S4 outputs a low-level switching signal $A_{SW}$, for example. Thus, the first switch SW1 has an OFF state. The low-level switching signal $A_{SW}$ passes through the inverter 30 so that it is inverted to have a high level, and the high-level switching signal $A_{SW}$ is supplied to the second switch SW2. Thus, the second switch SW2 has an ON state. When the first switch SW1 has an OFF state and the second switch SW2 has an ON state, the power source line $L_{P3}$ is coupled to the power source line $L_{P2}$ through the second switch SW2 so that the electricity storage unit 50 and the first functional unit 61 and the second functional unit 62 are coupled. Thus, the first functional unit 61 and the second functional unit 62 operate with the power supplied from the electricity storage unit 50. In other words, for example, in step S4, the power source that supplies power to the first functional unit 61 and the second functional unit 62 is switched from the power generating unit 10 to the electricity storage unit 50.

In step S5, the reset control unit 40 simultaneously outputs, from the output terminals 41 and 42, the reset signals $B_{RES1}$ and $B_{RES2}$, respectively, in accordance with the level inversion of the switching signal $A_{SW}$. The reset signal $B_{RES1}$ is supplied to the first functional unit 61, and the reset signal $B_{RES2}$ is supplied to the second functional unit 62. The first functional unit 61 and the second functional unit 62 have a reset state at the same time as each other in response to the reset signals $B_{RES1}$ and $B_{RES2}$. Thus, the communication link (handshake) established between the first functional unit 61 and the second functional unit 62 is interrupted once. However, when they recover from the reset states, a communication link (handshake) is established again between them so that they may communicate with each other.

In step S6, the switching control unit 20 determines whether the voltage VDD1 of the power source line $L_{P1}$ is higher than the threshold value VH or not. If the voltage VDD1 is lower than the threshold value VH, the power supply from the electricity storage unit 50 to the first functional unit 61 and the second functional unit 62 continues.

If the switching control unit 20 detects that the voltage VDD1 of the power source line $L_{P1}$ is higher than the threshold value VH, the switching control unit 20 in step S7 outputs the switching signal $A_{SW}$ having a high level, for example. Thus, the first switch SW1 has an ON state. The high-level switching signal $A_{SW}$ passes through the inverter 30 so that it is inverted to have a low level, and the low-level switching signal $A_{SW}$ is supplied to the second switch SW2.

Thus, the second switch SW2 has an OFF state. When the first switch SW1 has an ON state and the second switch SW2 has an OFF state, the power source line $L_{P3}$ is coupled to the power source line $L_{P1}$ through the first switch SW1 so that the power generating unit 10 and the first functional unit 61 and the second functional unit 62 are coupled. Thus, the first functional unit 61 and the second functional unit 62 operate with the power supplied from the power generating unit 10. In other words, for example, in step S7, the power source that supplies power to the first functional unit 61 and the second functional unit 62 is switched from the electricity storage unit 50 to the power generating unit 10.

In step S8, the reset control unit 40 simultaneously outputs, from the output terminals 41 and 42, the reset signals $B_{RES1}$ and $B_{RES2}$, respectively, in accordance with the level inversion of the switching signal $A_{SW}$. The reset signal $B_{RES1}$ is supplied to the first functional unit 61, and the reset signal $B_{RES2}$ is supplied to the second functional unit 62. The first functional unit 61 and the second functional unit 62 have a reset state at the same time as each other in response to the reset signals $B_{RES1}$ and $B_{RES2}$. Thus, the communication link (handshake) established between the first functional unit 61 and the second functional unit 62 is interrupted once. However, when they recover from the reset states, a communication link (handshake) is established again between them so that they may communicate with each other. After that, the processing is returned to step S3.

In this manner, with the power source apparatus 1, if VDD1>VH is satisfied, power is supplied from the power generating unit 10 to the first functional unit 61 and the second functional unit 62. If VDD1<VL is satisfied, power is supplied from the electricity storage unit 50 to the first functional unit 61 and the second functional unit 62. In synchronization with the time when the power source that supplies power to the first functional unit 61 and the second functional unit 62 is switched, the reset signals $B_{RES1}$ and $B_{RES2}$ are output so that the first functional unit 61 and the second functional unit 62 are reset at the same time as each other.

Figure 3:
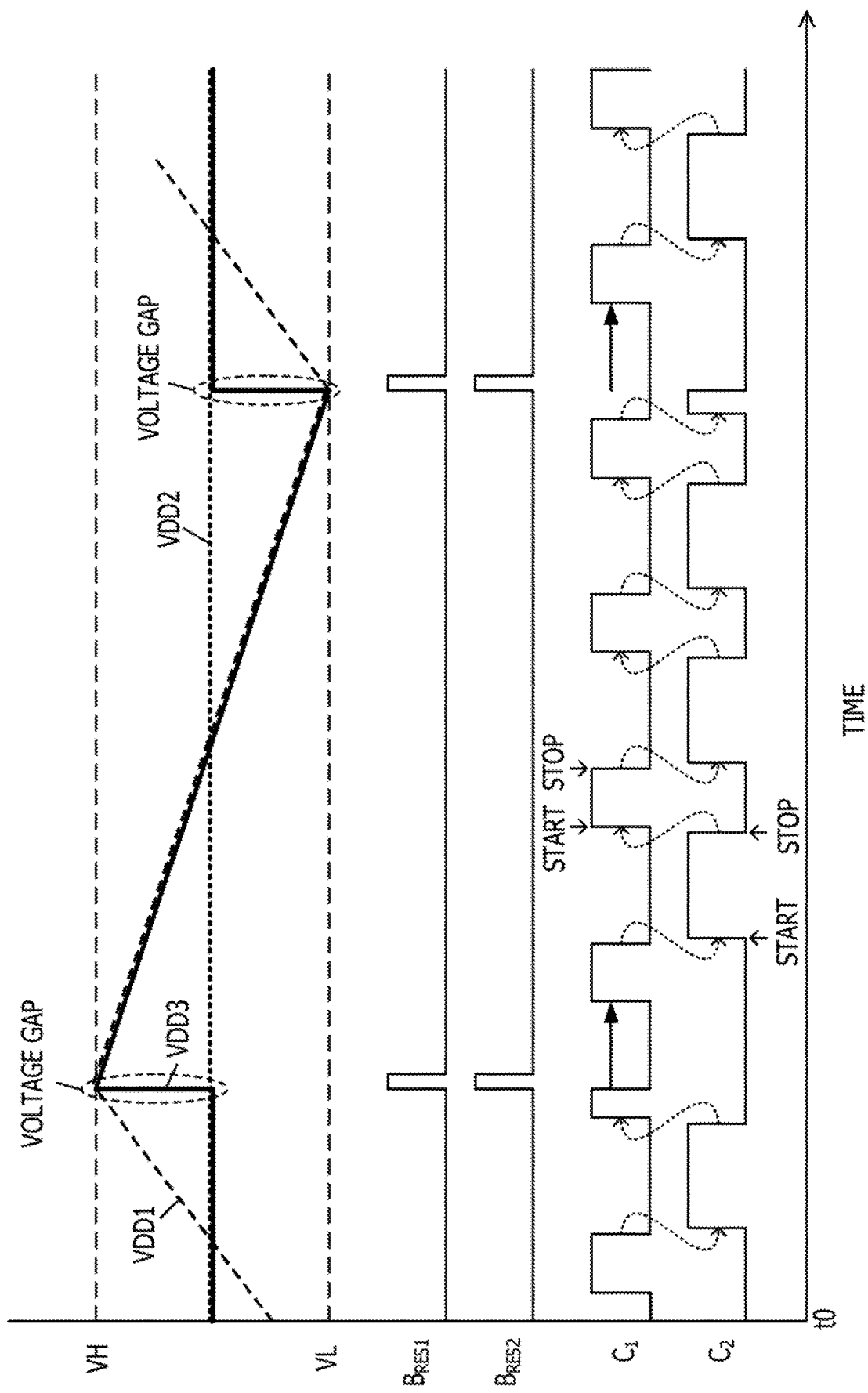
FIG. 3 is a timing chart illustrating an example of operations of the power source apparatus according to the embodiment of the disclosed technology.

FIG. 3 is a timing chart illustrating an example of an operation to be performed by the power source apparatus 1. FIG. 3 illustrates voltages VDD1, VDD2, and VDD3 to be supplied to the power source lines $L_{P1}$, $L_{P2}$ and $L_{P3}$, reset signals $B_{RES1}$ and $B_{RES2}$ and pulse signals $C_1$ and $C_2$ to be output from the first functional unit 61 and the second functional unit 62. FIG. 3 illustrates an example in a case where, at an initial state (time t0), the first switch SW1 has an OFF state and the second switch SW2 has an OFF state, and power is supplied from the electricity storage unit 50 to the first functional unit 61 and the second functional unit 62.

As described above, the first functional unit 61 starts at the fall of the pulse signal $C_2$ supplied from the second functional unit 62, supplies the pulse signal $C_1$ to the second functional unit 62, and then has a stop state (sleep state). The second functional unit 62 starts at the fall of the pulse signal $C_1$ supplied from the first functional unit 61, supplies the pulse signal $C_2$ to the first functional unit 61, and then has a stop state (sleep state). The pulse signal $C_2$ is a signal that falls after a predetermined period from a fall of the pulse signal $C_1$.

When the amount of power generation in the power generating unit 10 increases and the generation voltage increases, the voltage VDD1 of the power source line $L_{P1}$ increases with it. If the switching control unit 20 detects that the voltage VDD1 of the power source line $L_{P1}$ exceeds the threshold value VH, the switching control unit 20 outputs a high-level switching signal $A_{SW}$, for example. Thus, the first switch SW1 has an ON state and the second switch SW2 has an OFF state, and the power source line $L_{P3}$ is coupled to the power source line $L_{P1}$ through the first switch SW1 so that the power generating unit 10 and the first functional unit 61 and the second functional unit 62 are coupled. In other words, for example, the power source that supplies power to the first functional unit 61 and the second functional unit 62 is switched from the electricity storage unit 50 to the power generating unit 10.

The reset control unit 40 simultaneously outputs, from the output terminals 41 and 42, the reset signals $B_{RES1}$ and $B_{RES2}$, respectively, in accordance with the level inversion of the switching signal $A_{SW}$. Thus, the first functional unit 61 and the second functional unit 62 have a reset state at the same time as each other in response to the reset signals $B_{RES1}$ and $B_{RES2}$. Because the first functional unit 61 and the second functional unit 62 have a reset state, the communication link (handshake) established between the first functional unit 61 and the second functional unit 62 is interrupted once. However, when they recover from the reset states, a communication link (handshake) is established again between them so that they may communicate with each other.

When the power source line $L_{P3}$ is coupled to the power source line $L_{P1}$ through the first switch SW1, the level of the voltage VDD3 rapidly changes from the level of the voltage VDD2 to the level of the voltage VDD1. In other words, for example, with the power source switching, a voltage gap occurs in the power source line $L_{P3}$ to which the first functional unit 61 and the second functional unit 62 are coupled. When a voltage gap occurs in the power source line $L_{P3}$, there is a risk that the power-on reset function operates in one of the first functional unit 61 and the second functional unit 62. However, in the power source apparatus 1 according to this embodiment, when the power source is switched, the first functional unit 61 and the second functional unit 62 are simultaneously reset in response to the reset signals $B_{RES1}$ and $B_{RES2}$. This may avoid the interruption of a communication link (handshake) due to the operation of the power-on reset function in one of the first functional unit 61 and the second functional unit 62.

When the amount of power generation in the power generating unit 10 decreases and the generation voltage decreases, the voltage VDD1 of the power source line $L_{P1}$ drops. If the switching control unit 20 detects that the voltage VDD1 of the power source line $L_{P1}$ is lower than the threshold value VL, the switching control unit 20 outputs a low-level switching signal $A_{SW}$, for example. Thus, the first switch SW1 has an OFF state and the second switch SW2 has an ON state, and the power source line $L_{P3}$ is coupled to the power source line $L_{P2}$ through the second switch SW2 so that the electricity storage unit 50 and the first functional unit 61 and the second functional unit 62 are coupled. In other words, for example, the power source that supplies power to the first functional unit 61 and the second functional unit 62 is switched from the power generating unit 10 to the electricity storage unit 50.

The reset control unit 40 simultaneously outputs, from the output terminals 41 and 42, the reset signals $B_{RES1}$ and $B_{RES2}$, respectively, in accordance with the level inversion of the switching signal $A_{SW}$. Thus, the first functional unit 61 and the second functional unit 62 have a reset state at the same time as each other in response to the reset signals $B_{RES1}$ and $B_{RES2}$. Because the first functional unit 61 and the second functional unit 62 have a reset state, the communication link (handshake) established between the first functional unit 61 and the second functional unit 62 is interrupted once. However, when they recover from the reset states, a communication link is established again between them so that they may communicate with each other.

When the power source line $L_{P3}$ is coupled with the power source line $L_{P2}$ through the second switch SW2, the level of the voltage VDD3 rapidly changes from the level of the voltage VDD1 to the level of the voltage VDD2. In other words, for example, with the power source switching, a voltage gap occurs in the power source line $L_{P3}$ to which the first functional unit 61 and the second functional unit 62 are coupled. When a voltage gap occurs in the power source line $L_{P3}$, there is a risk that the power-on reset function operates in one of the first functional unit 61 and the second functional unit 62. However, in the power source apparatus 1 according to this embodiment, when the power source is switched, the first functional unit 61 and the second functional unit 62 are simultaneously reset in response to the reset signals $B_{RES1}$ and $B_{RES2}$. This may avoid the interruption of a communication link due to the operation of the power-on reset function in one of the first functional unit 61 and the second functional unit 62.

After a lapse of a predetermined period from a time when the power source that supplies power to the first functional unit 61 and the second functional unit 62 is switched (at a time when the switching signal $A_{SW}$ is level-inverted), the reset signals $B_{RES1}$ and $B_{RES2}$ are output. Thus, simultaneous reset of the first functional unit 61 and the second functional unit 62 may be securely performed.

Figure 4:
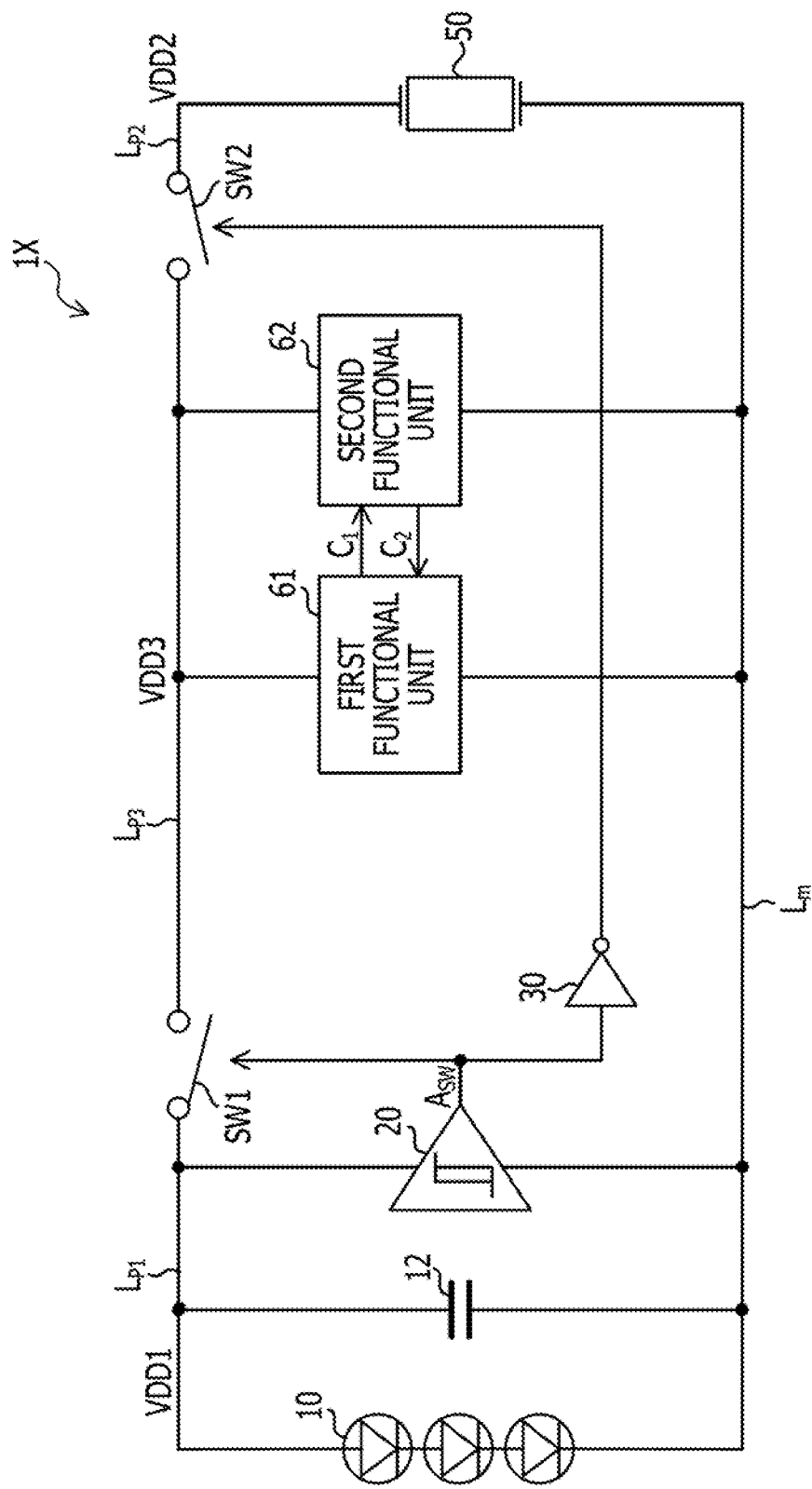
FIG. 4 is a diagram illustrating an example of a power source apparatus according to a comparison example.

FIG. 4 is a diagram illustrating an example of a configuration of a power source apparatus 1X according to a comparison example. The power source apparatus 1X according to the comparison example does not include the reset control unit 40 included in the power source apparatus 1 according to the embodiment of the technology disclosed herein.

Figure 5:
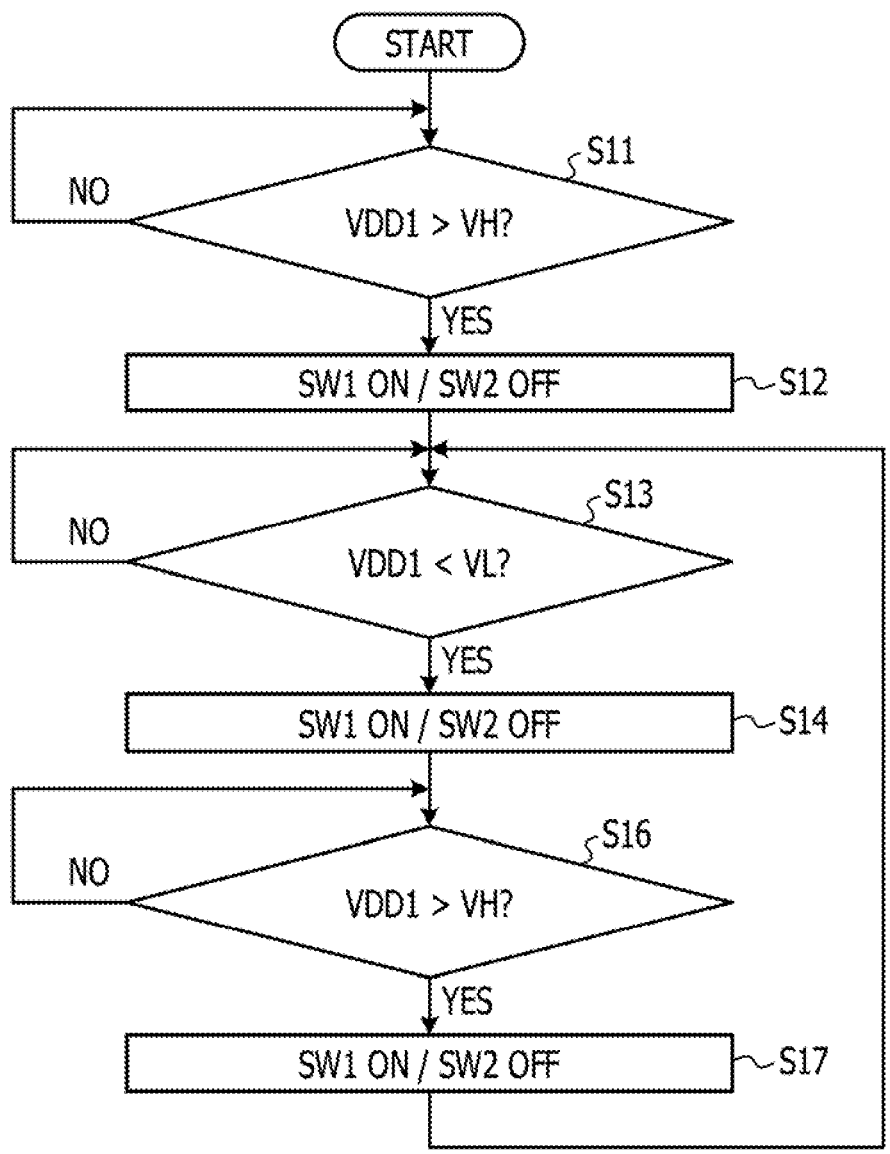
FIG. 5 is a flowchart illustrating an example of operations of the power source apparatus according to the comparison example.

FIG. 5 is a flowchart illustrating an example of operations of the power source apparatus 1X according to the comparison example. The processing in steps S11 to S14, S16 and S17 illustrated in FIG. 5 corresponds to the processing in steps S1 to S4, S6 and S7 illustrated in FIG. 2. In the power source apparatus 1X according to the comparison example, the step of outputting the reset signals $B_{RES1}$ and $B_{RES2}$ after the first switch SW1 and the second switch SW2 are switched (that is, after the power source is switched) is omitted.

Figure 6:
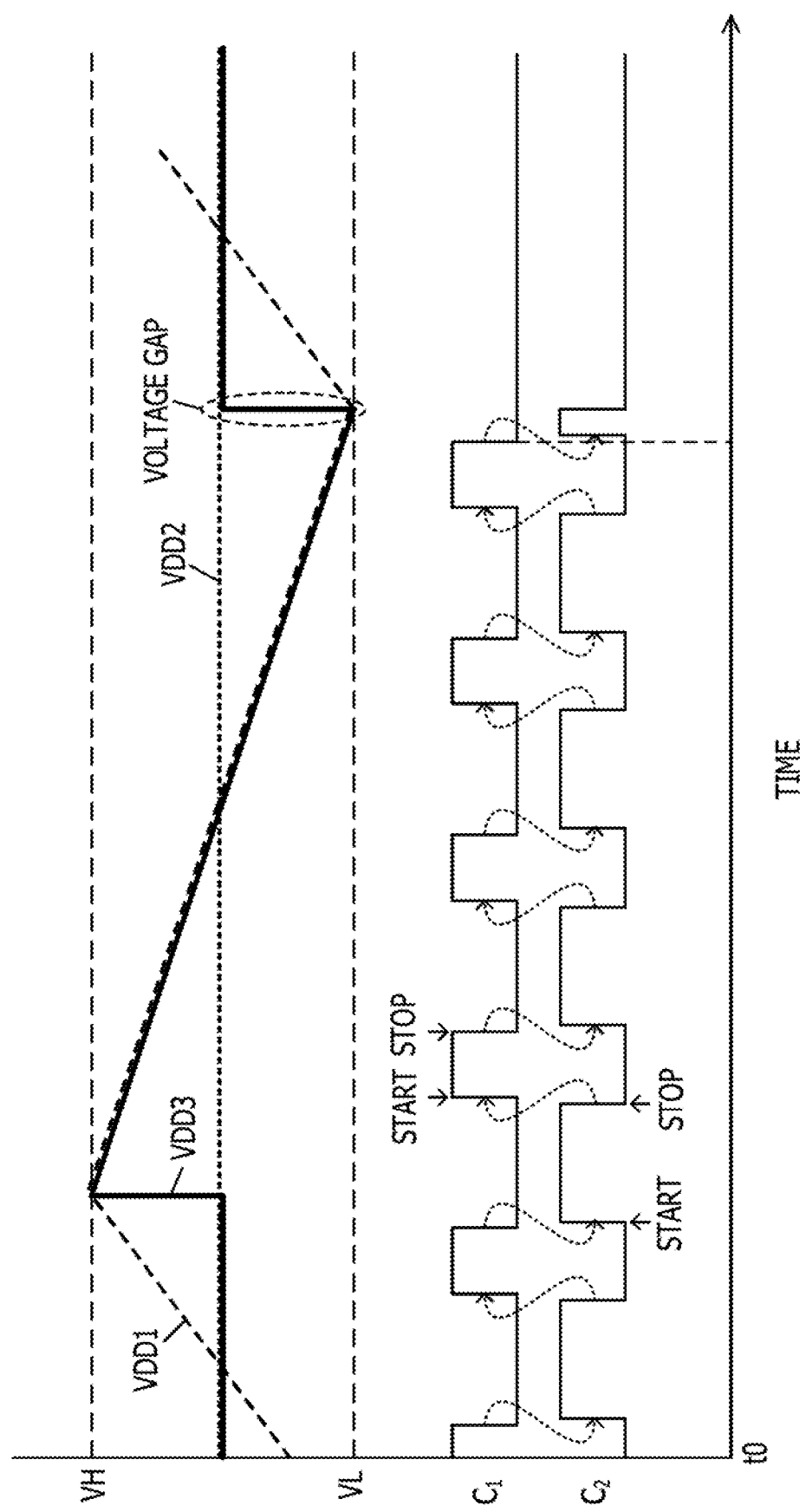
FIG. 6 is a timing chart illustrating an example of operations of the power source apparatus according to the comparison example.

FIG. 6 is a timing chart illustrating an example of operations of the power source apparatus 1x according to the comparison example. In the power source apparatus 1x according to the comparison example, when a voltage gap occurs in the power source line $L_{P3}$ with the switching of the power source, there is a risk that the power-on reset function operates in one of the first functional unit 61 and the second functional unit 62. FIG. 6 exemplarily illustrates a case where, when the level of the voltage VDD3 rapidly changes from the level of the voltage VDD1 to the level of the voltage VDD2 with the switching of the power source, the power-on reset function operates in the second functional unit 62. In this case, the second functional unit 62 loses information on a fall of the pulse signal $C_1$ from the first functional unit 61, which is received immediately before the power-on reset function operates. The second functional unit 62 may not generate a pulse signal $C_2$ if the information on the fall of the pulse signal $C_1$ is lost though the second functional unit 62 generates the pulse signal $C_2$ having a fall after a lapse of a predetermined period from the time of the fall of the pulse signal $C_1$. Because the first functional unit 61 starts in response to a fall of the pulse signal $C_2$, the first functional unit 61 may not start if the pulse signal $C_2$ is not generated. In this way, in the power source apparatus 1x according to the comparison example, the communication link (handshake) established between the first functional unit 61 and the second functional unit 62 is interrupted with the power source switching, and there is a risk that they are substantially functionally stopped.

On the other hand, in the power source apparatus 1 according to the embodiment of the technology disclosed herein, top-down reset management is performed in association with the power source switching. Thus, the first functional unit 61 and the second functional unit 62 may be reset simultaneously in synchronization with the time of power source switching without depending on a difference in operating conditions of the power-on reset in the first functional unit 61 and the second functional unit 62. This may avoid the interruption of the communication link (handshake) in the first functional unit 61 and the second functional unit 62 even when a voltage gap occurs in the power source line $L_{P3}$ with the power source switching. Therefore, the system may be operated in a stable manner. In other words, for example, the power source apparatus 1 according to the embodiment of the technology disclosed herein allows suppression of operational malfunctions of loads due to the power source switching.

In the power source apparatus 1, the switching control unit 20 controls the first switch SW1 and the second switch SW2 for power source switching based on a result of comparisons between the voltage VDD of the power source line $L_{P1}$ and the threshold values VH and VL. With this configuration, for example, power consumption may be reduced compared with a configuration in which power is supplied to loads by using a converter that receives voltage output from the power generating unit 10 or the electricity storage unit 50 as input voltage and outputs stabilized voltage. Therefore, the disclosed technology is applicable to a system including a power generating unit that converts environmental energy such as light, heat, vibrations and electric waves to electric power as one of power sources.

Second Embodiment

Figure 7:
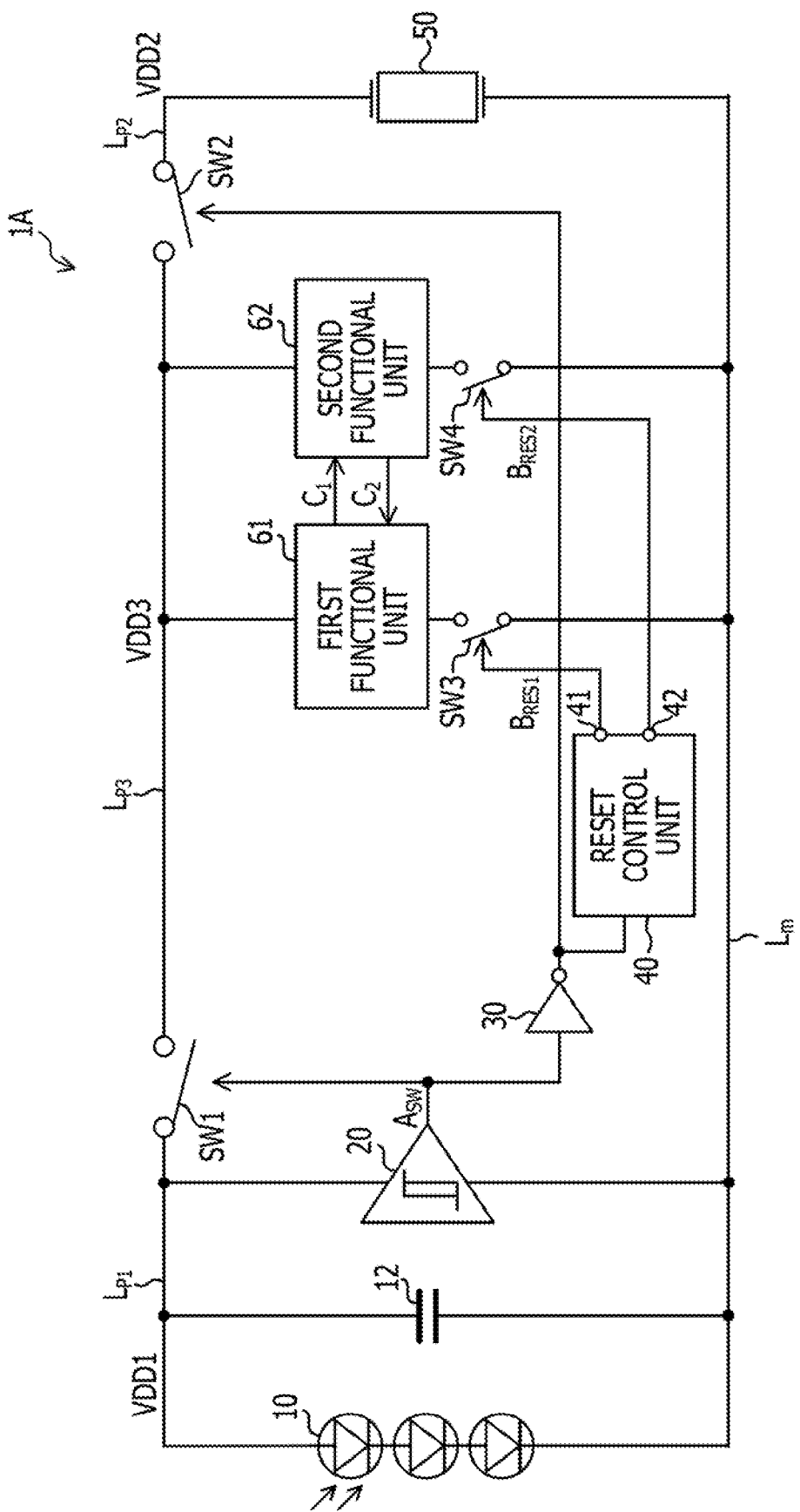
FIG. 7 is a diagram illustrating an example of a configuration of a power source apparatus according to an embodiment of a disclosed technology.

FIG. 7 is a diagram illustrating an example of a configuration of a power source apparatus 1A according to a second embodiment of the disclosed technology. The power source apparatus 1A has switches SW3 and SW4 functioning as a power shutdown unit that shuts down supply of power to the first functional unit 61 and the second functional unit 62 for a predetermined period based on the reset signals $B_{RES1}$ and $B_{RES2}$.

The switch SW3 is provided between the first functional unit 61 and the ground line $L_m$ and, when the reset signal $B_{RES1}$ is output, the switch SW3 has an OFF state and returns to have an ON state after a lapse of a predetermined period of time. Thus, the power-on reset function of the first functional unit 61 operates, and the first functional unit 61 is reset. Also, the switch SW4 is provided between the second functional unit 62 and the ground line $L_m$ and, when the reset signal $B_{RES2}$ is output, the switch SW4 has an OFF state and returns to have an ON state after a lapse of a predetermined period of time. Thus, the power-on reset function of the second functional unit 62 operates, and the second functional unit 62 is reset. Because the reset signals $B_{RES1}$ and $B_{RES2}$ are simultaneously output in accordance with the level inversion of the switching signal $A_{SW}$, the first functional unit 61 and the second functional unit 62 operate their power-on reset functions at the same time as each other based on the reset signals $B_{RES1}$ and $B_{RES2}$.

When a voltage gap occurs in the power source line $L_{P3}$, the power-on reset function may operate in one of the first functional unit 61 and the second functional unit 62. However, when the power source is shut down through the switches SW3 and SW4 for a predetermined period of time, the power-on reset functions of the first functional unit 61 and the second functional unit 62 may be securely operated.

In this manner, in the power source apparatus 1A according to the second embodiment of the disclosed technology, the power-on reset functions of the first functional unit 61 and the second functional unit 62 may be simultaneously operated upon power source switching. Therefore, like the power source apparatus 1 according to the first embodiment, operational malfunctions of loads due to the power source switching may be suppressed.

The power source apparatus 1A may address a case where the first functional unit 61 and the second functional unit 62 do not have a reset input terminal. Having described that, according to this embodiment, the switch SW3 is provided between the first functional unit 61 and the ground line $L_m$ and the switch SW4 is provided between the second functional unit 62 and the ground line $L_m$, embodiments are not limited thereto. The switch SW3 may be provided between the first functional unit 61 and the power source line $L_{P3}$, and the switch SW4 may be provided between the second functional unit 62 and the power source line $L_{P3}$.

Third Embodiment

Figure 8:
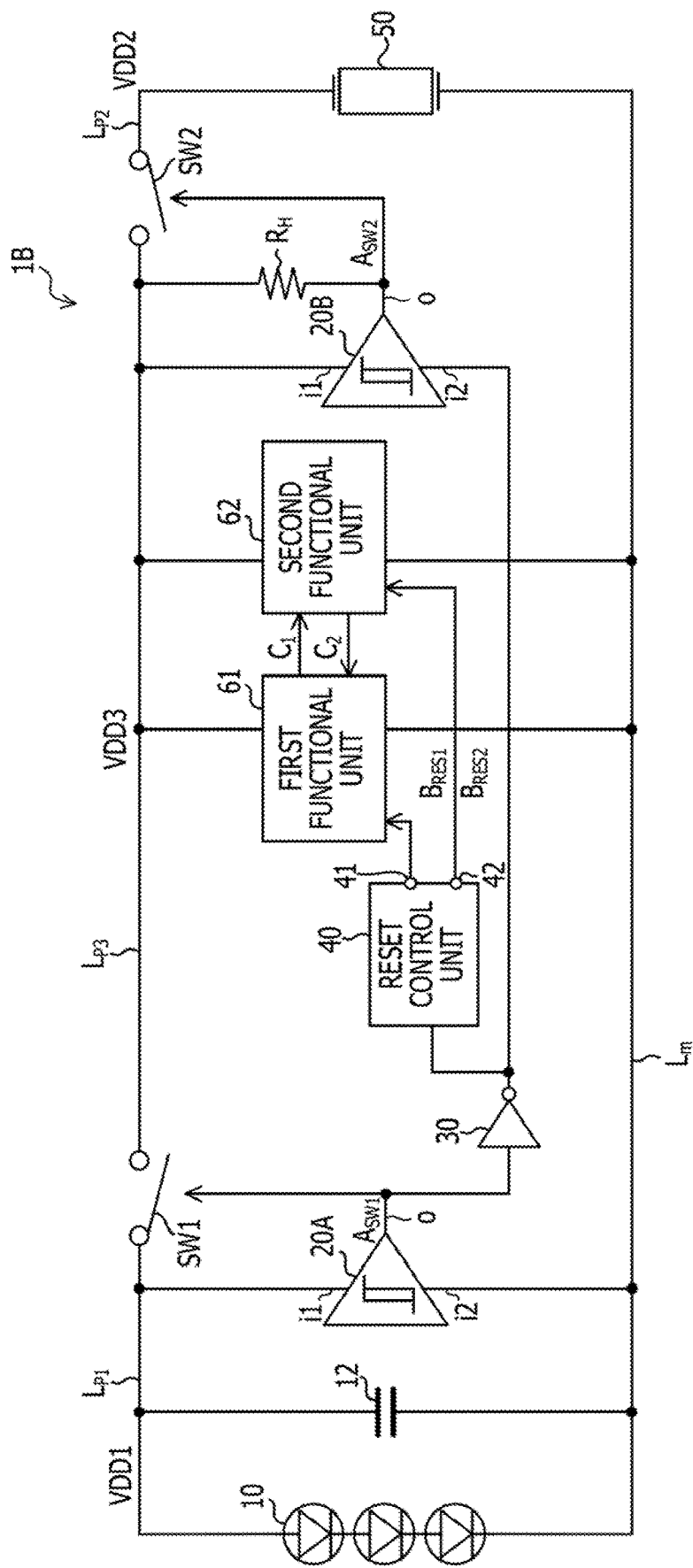
FIG. 8 is a diagram illustrating an example of a configuration of the power source apparatus according to an embodiment of the disclosed technology.

FIG. 8 is a diagram illustrating an example of a configuration of a power source apparatus 1B according to a third embodiment of the disclosed technology. The power source apparatus 1B includes a first switching control unit 20A and a second switching control unit 20B.

The first switching control unit 20A has a first input terminal i1 coupled with the power source line $L_{P1}$, a second input terminal i2 coupled with the ground line $L_m$ and an output terminal o. The first switching control unit 20A controls ON-OFF switching of the first switch SW1 based on the level of the voltage VDD1 of the power source line $L_{P1}$. When the level of the voltage VDD1 is higher than a threshold value VH1, the first switching control unit 20A outputs a switching signal $A_{SW1}$ that turns on the first switch SW1. On the other hand, when the level of the voltage VDD1 is lower than a threshold value VL1 that is lower than the threshold value VH1, the first switching control unit 20A outputs the switching signal $A_{SW1}$ that turns off the first switch SW1.

The second switching control unit 20B has a first input terminal i1 coupled with the power source line $L_{P3}$, a second input terminal i2 coupled with the output terminal of the inverter 30 and an output terminal o. The second switching control unit 20B controls ON-OFF switching of the second switch SW2 based on the level of the voltage VDD3 of the power source line $L_{P3}$. When the level of the voltage VDD3 is higher than a threshold value VH2 that is higher than the threshold value VH1, the second switching control unit 20B outputs a switching signal $A_{SW2}$ that turns on the second switch SW2. On the other hand, when the level of the voltage VDD3 is lower than a threshold value VL2 that is lower than the threshold value VH2, the second switching control unit 20B outputs the switching signal $A_{SW2}$ that turns off the second switch SW2.

The second input terminal i2 of the second switching control unit 20B is coupled with the output terminal o of the first switching control unit 20A through the inverter 30. The output terminal o of the second switching control unit 20B is coupled with one end of a pull-up resistance $R_H$ having the other end coupled with the power source line $L_{P3}$. In this configuration, when the first switching control unit 20A outputs a low-level switching signal $A_{SW1}$ that turns off the first switch SW1, a high-level signal is input to the second input terminal i2 of the second switching control unit 20B. When a high-level voltage is input to the second input terminal i2 of the second switching control unit 20B, the second switching control unit 20B outputs a high-level switching signal $A_{SW2}$ that turns on the second switch SW2 because of the effect of the pull-up resistance $R_H$.

Figure 9:
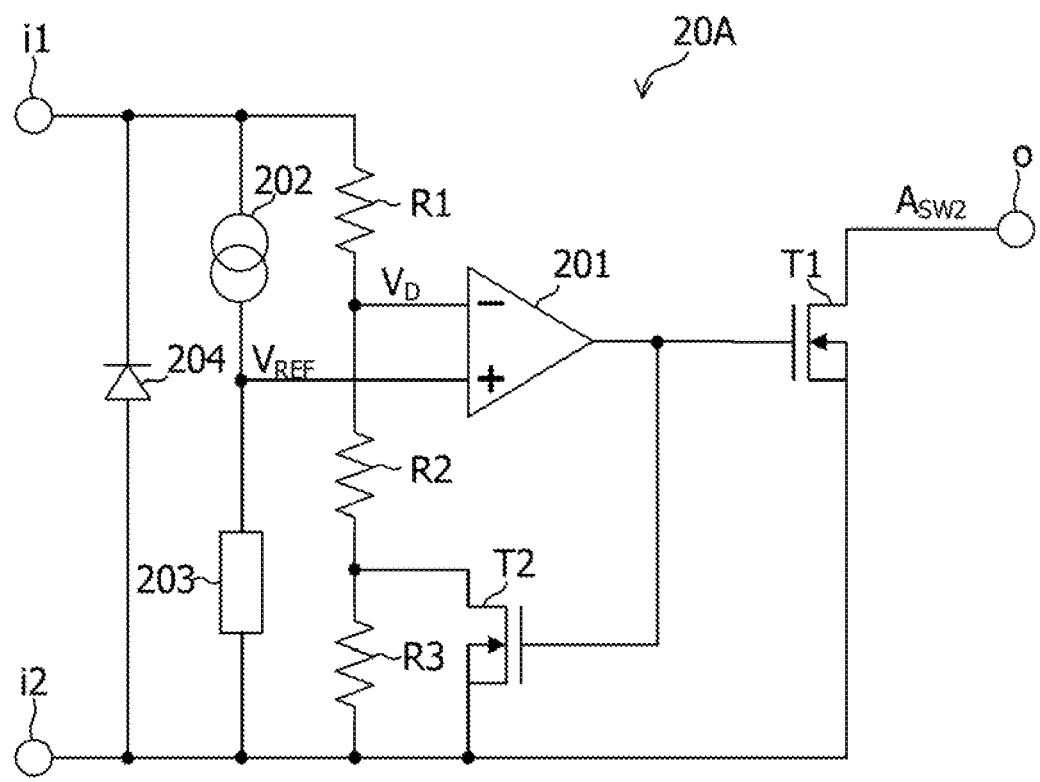
FIG. 9 is a diagram illustrating an example of a configuration of a second switching control unit according to the embodiment of the disclosed technology.

FIG. 9 is a diagram illustrating an example of the configuration of the second switching control unit 20B. The second switching control unit 20B has an output stage being an open-drain type hysteresis comparator. The second switching control unit 20B includes resistance elements R1, R2 and R3, transistors T1 and T2, an operational amplifier circuit 201, a current source 202, a reference voltage circuit 203, an electrostatic protection diode 204.

If the level of detection voltage VD acquired by dividing the voltage applied between the first input terminal i1 and the second input terminal i2 by the resistance elements R1 to R3 is lower than a reference voltage $V_{REF}$, the operational amplifier circuit 201 outputs a high-level signal. When the high-level signal is output from the operational amplifier circuit 201, the transistors T1 and T2 have an ON state, and the level of the switching signal $A_{SW2}$ output from the output terminal o is a low level.

On the other hand, if the level of the detection voltage VD is higher than the level of the reference voltage $V_{REF}$, the operational amplifier circuit 201 outputs a low-level signal. When the low-level signal is output from the operational amplifier circuit 201, the transistors T1 and T2 have an OFF state, and the level of the switching signal $A_{SW2}$ output from the output terminal o is a high level because of the effect of the pull-up resistance $R_H$ (see FIG. 8). The ON-OFF switching of the transistor T2 in accordance with the level of the output signal output from the operational amplifier circuit 201 changes the division ratios by the resistance elements R1 to R3. Thus, a hysteresis property is achieved in the second switching control unit 20B.

In a case where high-level voltage is input to the second input terminal i2 of the second switching control unit 20B because the first switching control unit 20A outputs a low-level switching signal $A_{SW1}$ that turns off the first switch SW1, the transistor T1 has an OFF state. In this case, the level of the switching signal $A_{SW2}$ output from the second switching control unit 20B is a high level because of the effect of the pull-up resistance $R_H$ (see FIG. 8). The first switching control unit 20A may have the same configuration as the configuration of the second switching control unit 20B.

Figure 10:
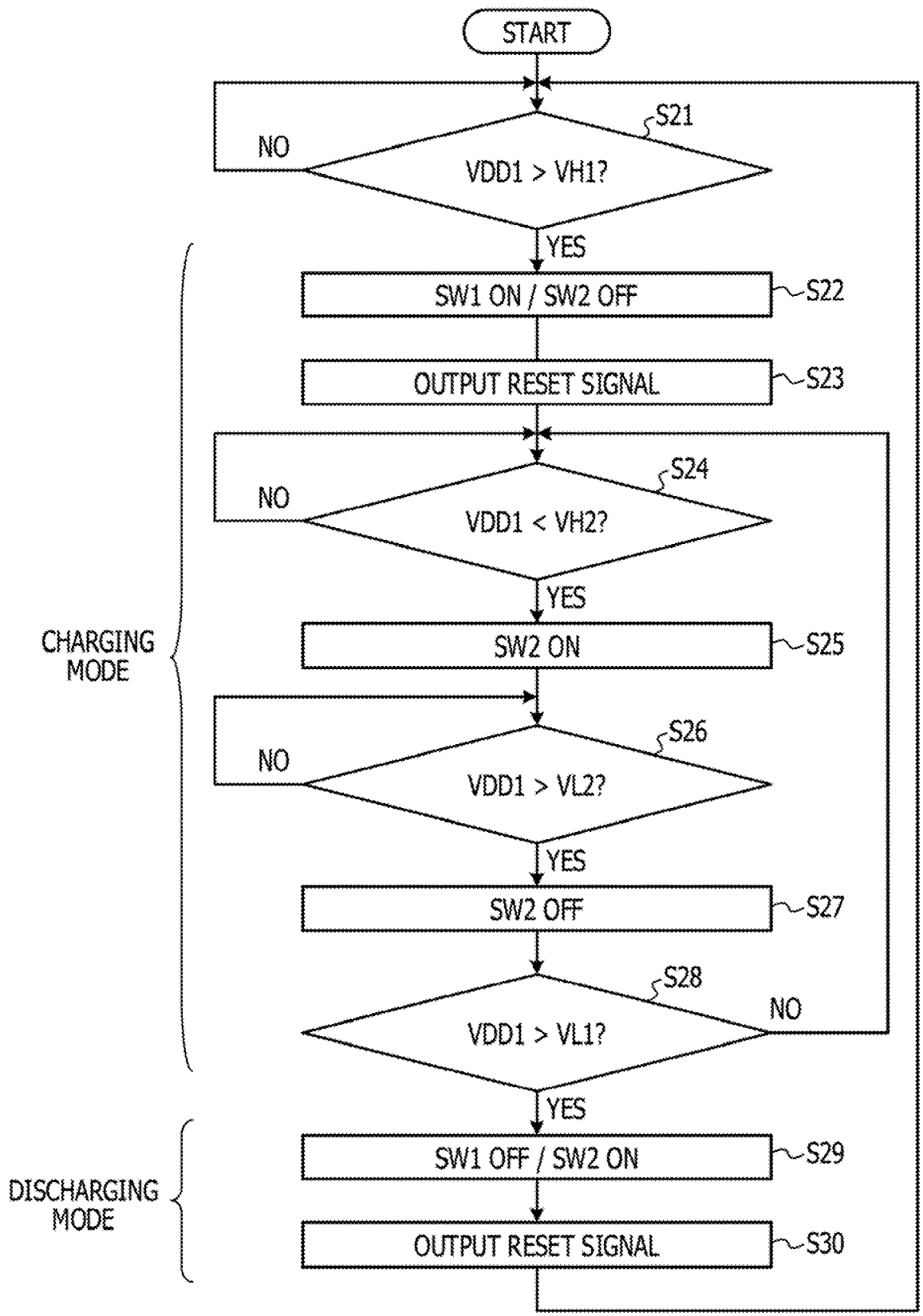
FIG. 10 is a flowchart illustrating an example of operations of the power source apparatus according to the embodiment of the disclosed technology.
Figure 11:
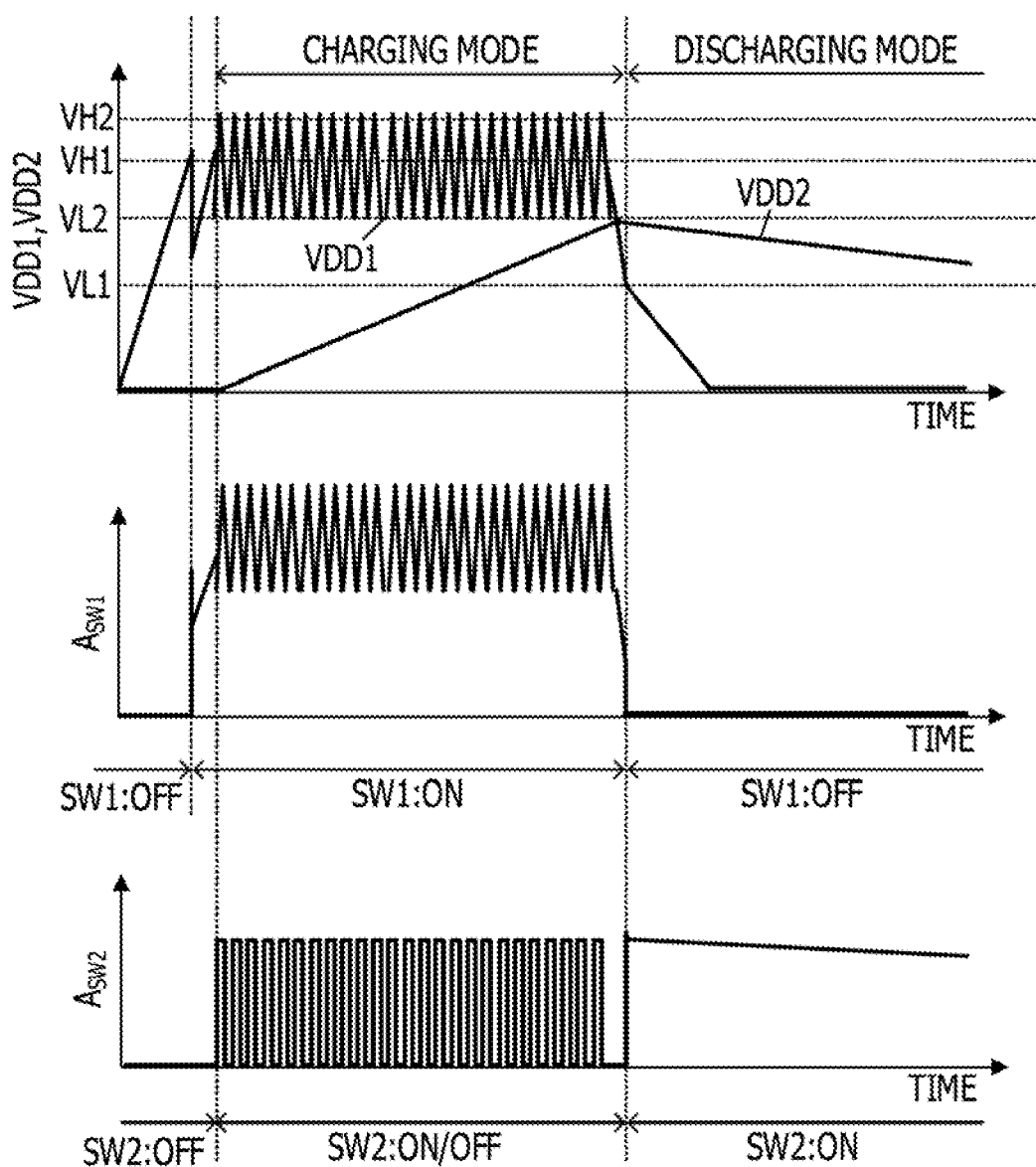
FIG. 11 is a diagram illustrating examples of operating waveforms of the power source apparatus according to the embodiment of the disclosed technology.

Operations to be performed by the power source apparatus 1B will be described below. FIG. 10 is a flowchart illustrating an example of operations to be performed by the power source apparatus 1B. FIG. 11 is a diagram illustrating an example of operating waveforms of the power source apparatus 1B. The upper part of FIG. 11 illustrates examples of waveforms of the voltage VDD1 of the power source line $L_{P1}$ and the voltage VDD2 of the power source line $L_{P2}$. The middle part of FIG. 11 illustrates an example of waveforms of a switching signal $A_{SW1}$ output from the first switching control unit 20A. The lower part of FIG. 11 illustrates an example of waveforms of a switching signal $A_{SW2}$ output from the second switching control unit 20B. It is further assumed that, at an initial state, the first switch SW1 and the second switch SW2 have an OFF state.

When the amount of power generation in the power generating unit 10 increases and the generation voltage increases, the voltage VDD1 of the power source line $L_{P1}$ increases with it. In step S21, the first switching control unit 20A determines whether the level of the voltage VDD1 is higher than the threshold value VH1 or not.

If the first switching control unit 20A detects that the level of the voltage VDD1 is higher than the threshold value VH1, the switching control unit 20A in step S22 outputs the switching signal $A_{SW1}$ having a high level. This turns on the first switch SW1 and keeps the second switch SW2 at an OFF state. Because of the first switch SW1 having an ON state, the first functional unit 61 and the second functional unit 62 operate with power supplied from the power generating unit 10.

The switching signal $A_{SW1}$ output from the first switching control unit 20A is inverted to have a low level through the inverter 30 and is input to the second input terminal i2 of the second switching control unit 20B. When the first switch SW1 has an ON state and the low-level signal is applied to the second input terminal i2 of the second switching control unit 20B, the second switching control unit 20B is enabled to detect the level of the voltage VDD1 (=VDD3).

In step S23, the reset control unit 40 simultaneously outputs, from the output terminals 41 and 42, the reset signals $B_{RES1}$ and $B_{RES2}$, respectively, in accordance with the level inversion of the switching signal $A_{SW1}$. The first functional unit 61 and the second functional unit 62 have a reset state at the same time as each other in response to the reset signals $B_{RES1}$ and $B_{RES2}$.

In step S24, the second switching control unit 20B determines whether the level of the voltage VDD1 (=VDD3) is higher than the threshold value VH2 (>VH1) or not. If the second switching control unit 20B detects that the level of the voltage VDD1 (=VDD3) is higher than the threshold value VH2, the switching control unit 20B outputs the switching signal $A_{SW2}$ having a high level. Thus, the second switch SW2 has an ON state in step S25.

When both of the first switch SW1 and the second switch SW2 have an ON state, the electricity storage unit 50 is coupled with the power generating unit 10 and the capacitor 12 so that the electricity storage unit 50 is charged with power generated by the power generating unit 10. Because the electricity storage unit 50 has a larger storage capacity than that of the capacitor 12, charges move from the capacitor 12 to the electricity storage unit 50, which lowers the level of the voltage VDD1 (=VDD3).

The second switching control unit 20B in step S26 determines whether the level of the voltage VDD1 (=VDD3) is lower than the threshold value VL2 (<VH2) or not. If the second switching control unit 20B detects that the level of the voltage VDD1 (=VDD3) is lower than the threshold value VL2, the switching control unit 20B outputs the switching signal $A_{SW2}$ having a low level. Thus, the second switch SW2 has an OFF state in step S27.

When the second switch SW2 has an OFF state, the electricity storage unit 50 is separated from the power generating unit 10 and the capacitor 12. In a case where the amount of power generation in the power generating unit 10 is higher (negative in step S28, which will be described below), when the second switch SW2 has an OFF state, the level of the voltage VDD1 (=VDD3) increases again. In this case, the processing from step S24 to step S27 is repeated, and the second switch SW2 repeats ON-OFF operations.

FIG. 11 illustrates a state that the level of the voltage VDD1 vibrates little by little between the third threshold value VH2 and the fourth threshold value VL2 because the ON-OFF operations are repeated in the second switch SW2. While the ON-OFF operations are being repeated in the second switch SW2, the charging voltage of the electricity storage unit 50 (or the voltage VDD2 of the power source line $L_{P2}$) gradually increases. In a case where the amount of power generation in the power generating unit 10 is higher, the ON-OFF operations in the second switch SW2 continue if the charging voltage (VDD2) does not exceed the threshold value VL2. Because the ON-OFF operations are repeated in the second switch SW2, the electricity storage unit 50 is intermittently charged. In a case where the amount of power generation per unit time is higher in the power generating unit 10, the power source apparatus 1B operates in a charging mode in which the electricity storage unit 50 is charged with power generated in the power generating unit 10 and, at the same time, power is supplied to the first functional unit 61 and the second functional unit 62.

When the amount of power generation in the power generating unit 10 decreases and generation voltage decreases, the level of the voltage VDD1 is lowered. In step S28, the first switching control unit 20A determines whether the level of the voltage VDD1 is lower than the threshold value VL1 or not. If the first switching control unit 20A detects that the level of the voltage VDD1 is lower than the threshold value VL1, the switching control unit 20A outputs the switching signal $A_{SW1}$ having a low level. Thus, the first switch SW1 has an OFF state in step S29.

The low-level switching signal $A_{SW1}$ output from the first switching control unit 20A is inverted to have a high level through the inverter 30 and is input to the second input terminal i2 of the second switching control unit 20B. When the high-level signal is input to the second input terminal i2 of the second switching control unit 20B, the second switching control unit 20B outputs a high-level switching signal $A_{SW2}$ because of the effect of the pull-up resistance $R_H$. Thus, the second switch SW2 has an ON state in step S29.

When the first switch SW1 has an OFF state and the second switch SW2 has an ON state, a discharging mode is started in which power stored in the electricity storage unit 50 is supplied to the first functional unit 61 and the second functional unit 62. In other words, for example, the power source that supplies power to the first functional unit 61 and the second functional unit 62 is switched from the power generating unit 10 to the electricity storage unit 50. In the discharging mode, the first switch SW1 has an OFF state, and the electricity storage unit 50 is separated from the power generating unit 10. The second switching control unit 20B may keep its operating state with power stored in the electricity storage unit 50 in the discharging mode.

In step S30, the reset control unit 40 simultaneously outputs, from the output terminals 41 and 42, the reset signals $B_{RES1}$ and $B_{RES2}$, respectively, in accordance with the level inversion of the switching signal $A_{SW1}$. The first functional unit 61 and the second functional unit 62 have a reset state at the same time as each other in response to the reset signals $B_{RES1}$ and $B_{RES2}$. After that, the processing is returned to step S21.

In this manner, in a case where the amount of power generation per unit time is higher in the power generating unit 10, the power source apparatus 1B operates in a charging mode in which the electricity storage unit 50 is charged with power generated in the power generating unit 10 and, at the same time, power is supplied to the first functional unit 61 and the second functional unit 62. In the charging mode, the second switch SW2 repeats ON-OFF operations, and the electricity storage unit 50 is intermittently charged. Thus, the voltage VDD1 of the power source line $L_{P1}$ and the charging voltage of the electricity storage unit 50 (or voltage VDD2 of the power source line $L_{P2}$) do not have an equal level to each other (VDD1≠VDD2). Therefore, in the charging mode, the generation voltage of the power generating unit 10 may be detected without any influence of the charging voltage of the electricity storage unit 50.

On the other hand, in a case where the amount of power generation per unit time is lower in the power generating unit 10, the power source apparatus 1B operates in the discharging mode in which the power stored in the electricity storage unit 50 is supplied to the first functional unit 61 and the second functional unit 62. In the discharging mode, the first switch SW1 has an OFF state, and the electricity storage unit 50 and the power generating unit 10 are separated.

In this manner, in the charging mode, the first switching control unit 20A may detect the level of the generation voltage (voltage VDD1) of the power generating unit 10 without any influence of the charging voltage (voltage VDD2) of the electricity storage unit 50. Thus, the switching from the charging mode to the discharging mode may be performed at a proper time. In other words, for example, before the voltage VDD1 is lower than the charging voltage (voltage VDD2) and a backflow occurs in which current flows from the electricity storage unit 50 to the power generating unit 10, the first switch SW1 may be turned off to shut down the current path. By suppressing the backflow of the current, wasteful consumption of power stored in the electricity storage unit 50 may be suppressed.

In the power source apparatus 1B, top-down reset management is performed in association with the power source switching, like the power source apparatus 1 according to the first embodiment. Thus, occurrence of operational malfunctions of loads due to the power source switching may be suppressed.

Fourth Embodiment

Figure 12:
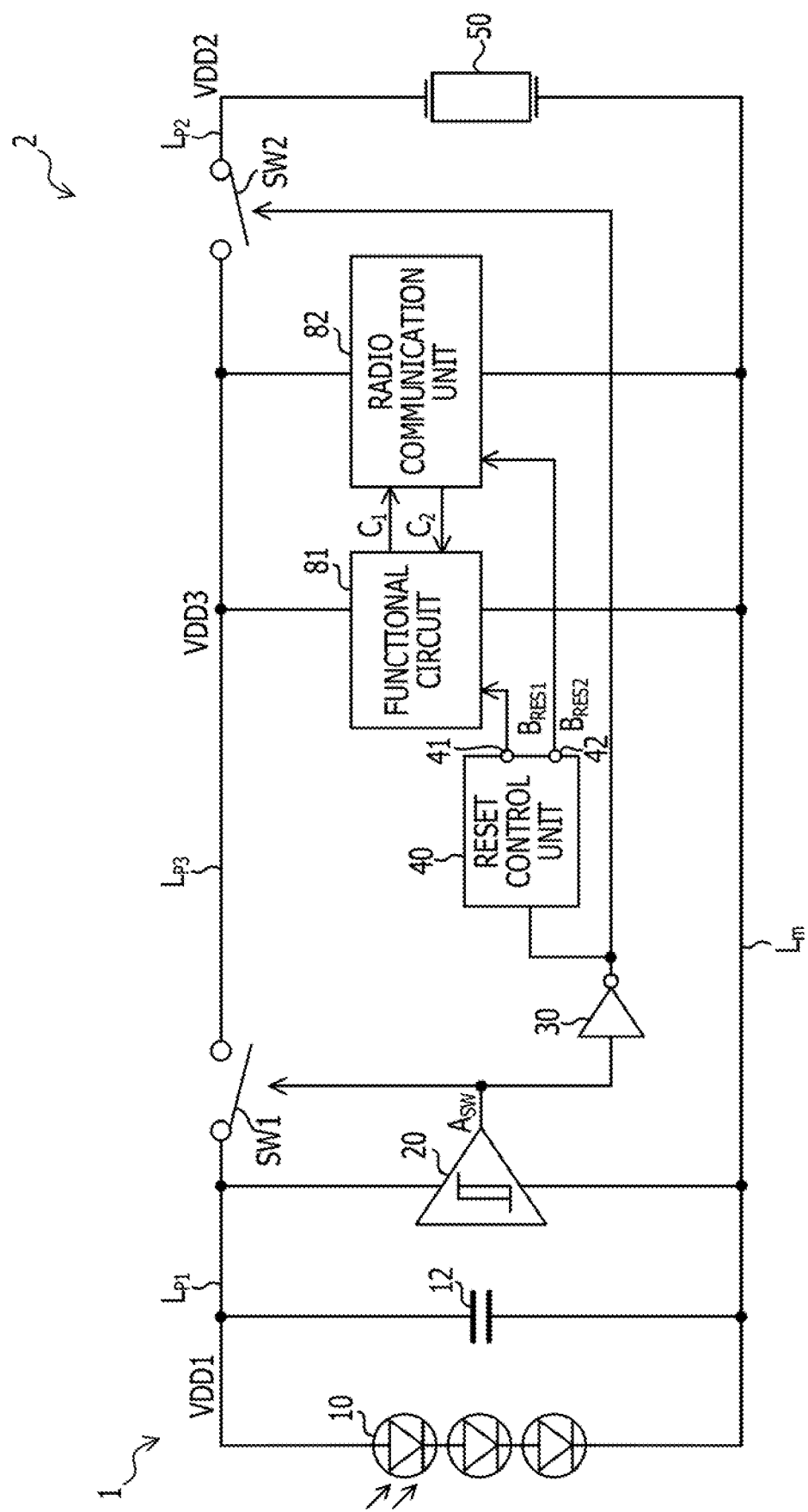
FIG. 12 is a diagram illustrating an example of a configuration of a communication apparatus according to an embodiment of the disclosed technology.

FIG. 12 is a diagram illustrating an example of a configuration of a communication apparatus 2 according to a fourth embodiment of the disclosed technology. The communication apparatus 2 includes a power source apparatus 1, a functional circuit 81 as a first functional unit that operates by receiving supply of power from the power source apparatus 1 and a radio communication unit 82 as a second functional unit. The functional circuit 81 and the radio communication unit 82 are driven by power generated by the power generating unit 10 if VDD1>VH is satisfied and is driven by power stored in the electricity storage unit 50 if VDD1<VL is satisfied.

The functional circuit 81 may be a sensor, for example. As the sensor, any sensor is applicable such as a temperature sensor, a humidity sensor, an illuminance sensor, and a voltage sensor. In a case where the functional circuit 81 is a sensor, the radio communication unit 82 has a function that transmits data obtained by the sensor as the functional circuit 81 to an external device by radio communication. The functional circuit 81 and the radio communication unit 82 establish a communication link (handshake) therebetween and implement a predetermined function by communicating with each other. The communication apparatus 2 may be a sensor node in a sensor network. The functional circuit 81 may be an external timer. In a case where the functional circuit 81 is an external timer, the radio communication unit 82 supplies a pulse signal $C_2$ to the external timer as the functional circuit 81, and the radio communication unit 82 then has a sleep state. The external timer as the functional circuit 81 after a lapse of a predetermined period of time from the time when the functional circuit 81 receives the pulse signal $C_2$ from the radio communication unit 82 supplies a pulse signal $C_1$ to the radio communication unit 82. The radio communication unit 82 is started by the pulse signal $C_1$ and shifts from the sleep state to an operating state. The communication apparatus 2 may include the power source apparatus 1A or the power source apparatus 1B instead of the power source apparatus 1. In a case where the communication apparatus 2 includes the power source apparatus 1B, the functional circuit 81 and the radio communication unit 82 are driven by power generated by the power generating unit 10 in the charging mode and are driven by power stored in the electricity storage unit 50 in the discharging mode.

Having exemplarily described that, according to the first to fourth embodiments, the power generating unit 10 is used as the first power source and the electricity storage unit 50 is used as the second power source, embodiments are not limited thereto. For example, a secondary battery may be used as the first power source, and a primary battery may be used as the second power source. Having exemplarily described that, according to the first to fourth embodiments, the first switch SW1 and the second switch SW2 are placed over a power source line on the positive electrode side of the power generating unit 10, embodiments are not limited thereto. The first switch SW1 and the second switch SW2 may be placed over a ground line on the negative electrode side of the power generating unit 10.

The power source apparatuses 1, 1A and 1B are examples of a power source apparatus according to embodiments of the disclosed technology. The switching control unit 20, the first switching control unit 20A and the second switching control unit 20B are examples of a switching control unit according to embodiments of the disclosed technology. The reset control unit 40 is an example of a reset control unit according to embodiments of the disclosed technology. The power generating unit 10 is an example of a power generating unit according to embodiments of the disclosed technology. The electricity storage unit 50 is an example of an electricity storage unit according to embodiments of the disclosed technology. The first switch SW1 is an example of a first switch according to embodiments of the disclosed technology. The second switch SW2 is an example of a second switch according to embodiments of the disclosed technology. The first functional unit 61 is an example of a first functional unit according to embodiments of the disclosed technology. The second functional unit 62 is an example of a second functional unit according to embodiments of the disclosed technology. The communication apparatus 2 is an example of a communication apparatus according to embodiments of the disclosed technology.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A power source apparatus comprising:
    a switching control circuit configured to output a switching signal to switch a power source supplying power to each of a plurality of loads, the plurality of loads being configured to establish a communication link between them by handshake processing and communicate using the established communication link to perform given processing; and
    a reset control circuit having a plurality of output terminals outputting, in response to the switching signal, reset signals that reset each of the plurality of loads, the outputting of the reset signals being configured to cause each of the plurality of loads to perform the handshake processing to reestablish the communication link.

2. The power source apparatus according to claim 1, wherein
    the reset control circuit outputs the reset signals in response to a change of a level of the switching signal.

3. The power source apparatus according to claim 2, wherein
    the reset control circuit outputs the reset signals after a lapse of a predetermined period of time from a change of the level of the switching signal.

4. The power source apparatus according to claim 1, wherein
    the switching control circuit outputs the switching signal based on the level of voltage output from one of the power sources.

5. The power source apparatus according to claim 1, further comprising:
    a first switch controlled by the switching signal and configured to couple a first power source and the plurality of loads when the first switch has an ON state; and
    a second switch controlled by the switching signal and configured to couple a second power source different from the first power source and the plurality of loads when the second switch has an ON state.

6. The power source apparatus according to claim 5, wherein
    the switching control circuit outputs a switching signal to turn on the first switch and turn off the second switch in a case where a level of voltage output from the first power source is higher than a first threshold value and outputs a switching signal to turn off the first switch and turn on the second switch in a case where the level of the voltage output from the first power source is lower than a second threshold value lower than the first threshold value.

7. The power source apparatus according to claim 5, further comprising:
    a power generating circuit as the first power source; and
    an electricity storage circuit as the second power source.

8. The power source apparatus according to claim 1, further comprising:
    a power source shutdown circuit configured to shut down supply of power to each of the plurality of loads for a predetermined period of time based on the reset signal.

9. A communication apparatus comprising:
    a plurality of functional circuits, each of the plurality of functional circuits being configured to establish a communication link between them by handshake processing and communicate with each other to perform given processing;
    a switching control circuit configured to output a switching signal to switch the power source supplying power to each of the plurality of functional circuits; and
    a reset control circuit having a plurality of output terminals outputting, in response to the switching signal, reset signals that reset each of the plurality of functional circuits, the outputting of the reset signals being configured to cause each of the plurality of functional circuits to perform the handshake processing to reestablish the communication link,
    wherein at least one of the plurality of functional circuits implements a radio communication function.

10. The communication apparatus according to claim 9, wherein
    the reset control circuit outputs the reset signals in response to a change of a level of the switching signal.

11. The communication apparatus according to claim 10, wherein
    the reset control circuit outputs the reset signals after a lapse of a predetermined period of time from a change of the level of the switching signal.

12. The communication apparatus according to claim 9, wherein
    the switching control circuit outputs the switching signal based on the level of voltage output from one of the power sources.

13. The communication apparatus according to claim 9, further comprising:
    a first switch controlled by the switching signal and configured to couple a first power source and the first functional circuit when the first switch has an ON state; and
    a second switch controlled by the switching signal and configured to couple a second power source different from the first power source and the second functional circuit when the second switch has an ON state.

14. The communication apparatus according to claim 13, wherein
    the switching control circuit outputs a switching signal to turn on the first switch and turn off the second switch in a case where a level of voltage output from the first power source is higher than a first threshold value and outputs a switching signal to turn off the first switch and turn on the second switch in a case where the level of the voltage output from the first power source is lower than a second threshold value lower than the first threshold value.

15. The communication apparatus according to claim 13, further comprising:
    a power generating circuit as the first power source; and
    an electricity storage circuit as the second power source.

16. The communication apparatus according to claim 9, further comprising:
    a power source shutdown circuit configured to shut down supply of power to each of
    the plurality of loads for a predetermined period of time based on the reset signal.

* * * * *